United States Patent
Nagai et al.

(10) Patent No.: US 7,349,302 B2
(45) Date of Patent: Mar. 25, 2008

(54) OPTICAL DISK RECORDING APPARATUS AND OPTICAL DISK RECORDING METHOD

(75) Inventors: Yutaka Nagai, Yokohama (JP); Takehiko Sekine, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 747 days.

(21) Appl. No.: 10/641,904

(22) Filed: Aug. 15, 2003

(65) Prior Publication Data
US 2004/0179446 A1 Sep. 16, 2004

(30) Foreign Application Priority Data
Mar. 11, 2003 (JP) ............... 2003-064326

(51) Int. Cl.
*G11B 7/00* (2006.01)
(52) U.S. Cl. ............... 369/47.28; 369/30.25; 369/59.19
(58) Field of Classification Search ............ 369/47.28, 369/47.22, 47.48, 47.14, 44.13, 59.22, 47.54, 369/44.28, 44.34, 44.41, 30.25, 59.19
See application file for complete search history.

(56) References Cited

U.S. PATENT DOCUMENTS

| | | | | |
|---|---|---|---|---|
| 6,333,902 B1 * | 12/2001 | Shim | ............... | 369/47.54 |
| 6,587,417 B2 * | 7/2003 | Okamoto et al. | ........ | 369/59.22 |
| 6,879,771 B1 * | 4/2005 | Yoshida et al. | .......... | 369/47.14 |
| 6,882,609 B2 * | 4/2005 | Williams et al. | ......... | 369/47.48 |
| 6,963,521 B2 * | 11/2005 | Hayashi | ................... | 369/44.13 |
| 7,050,373 B2 * | 5/2006 | Tonami et al. | ........... | 369/47.48 |
| 7,110,333 B2 * | 9/2006 | Oh | .......................... | 369/47.22 |

FOREIGN PATENT DOCUMENTS

| | | |
|---|---|---|
| JP | 10-340536 | 12/1998 |
| JP | 2000-195177 A | 7/2000 |
| JP | 2000-293855 | 10/2000 |
| JP | 2002-298365 A | 10/2002 |

* cited by examiner

*Primary Examiner*—Tan Dinh
*Assistant Examiner*—Kim-Kwok Chu
(74) *Attorney, Agent, or Firm*—Townsend and Townsend and Crew LLP

(57) ABSTRACT

For protecting the recording from shifting in the position, by conducting sync detection, correctly, from land pre pits, in an optical type recording disc, even if sync pattern errors, in more detail, synchronization is conducted on a recording circuit, with certainty, even if an even sync pattern erroneously changes into an odd sync pattern. When the even sync pattern is detected from an odd sync pattern detection window, a sync lock flag is turned into a condition of unlock. When the sync lock flag continues a lock condition for 16 sectors, the synchronization is carried out on a detection cycle counter and a recording cycle counter.

13 Claims, 12 Drawing Sheets

| Pre-recoded sector number | Bit Position | | |
|---|---|---|---|
| | 0 | 1 to 4 | 5 to 12 |
| 0 | sync | 0000b | DATA |
| 1 | sync | 0001b | DATA |
| 2 | sync | 0010b | DATA |
| 3 | sync | 0011b | ParityA(upper) |
| 4 | sync | 0100b | ParityA(middle) |
| 5 | sync | 0101b | ParityA(lower) |
| 6 | sync | 0110b | DATA |
| 7 | sync | 0111b | DATA |
| 8 | sync | 1000b | DATA |
| 9 | sync | 1001b | DATA |
| 10 | sync | 1010b | DATA |
| 11 | sync | 1011b | DATA |
| 12 | sync | 1100b | DATA |
| 13 | sync | 1101b | ParityB(upper) |
| 14 | sync | 1110b | ParityB(middle) |
| 15 | sync | 1111b | ParityB(lower) |

FIG.7

| | b2 | b1 | b0 |
|---|---|---|---|
| Pre-recoded sector sync in Even position | 1 | 1 | 1 |
| Pre-recoded sector sync in odd position | 1 | 1 | 0 |
| Pre-recoded data = 1b | 1 | 0 | 1 |
| Pre-recoded data = 0b | 1 | 0 | 0 |

OPTICAL DISK RECORDING APPARATUS AND OPTICAL DISK RECORDING METHOD

BACKGROUND OF THE INVENTION

1. Field of the Invention

The present invention relates to a recording apparatus for recording on a DVD-R or a DVD-RW, for example, and in particular, it relates to a recording apparatus, while reproducing land pre pit information, which is recorded on a land track in advance, for indicating address information on the disk, for recording on the disk in accordance therewith.

2. Description of the Related Art

Conventionally, reproduction of the land pre pits is performed in the following manner, in particular, on those that are formed on the DVD-R and/or DVD-RW. First of all, a light beam is irradiated upon the groove track, on which information is recorded, thereby obtaining a wobble signal from a reflection light thereof, through so-called a push-pull method. This wobble signal is then compared to a predetermined threshold signal, so as to extract a signal therefrom, exceeding the threshold signal, thereby obtaining the land pre pit signals, which are superimposed on the wobble signal.

Next, when counting five (5) cycle periods of the wobble signal where no land pre pit can detected, on the land pre pit signal, three (3) cycles of the wobble signals are counted just thereafter, and then a gate signal is outputted, for allowing detection of the land pre pit information within that period. When the land pre pit is detected during those three (3) cycles, eight (8) cycles of the wobble signals are counted up starting from the timing of detection of the first land pre pit upon a recording reference clock. Thereafter, only the land prepit signal is adopted, which appears in the front three (3) cycles of those eight (8) cycles of the wobble signals.

When a counter for counting the eight (8) cycles of wobble signals counts, but under erroneous timing, it comes to be inconsistent with the three (3) cycles of wobble signals for allowing the detection, in the timing thereof, and then the counter for the eight (8) cycles of wobble signals is preset. Conventionally, the decode processing is conducted on the land pre pit information, in such the manner as is mentioned, for example, in Japanese Patent Laying-Open No. Hei 10-340536 (1998) <JP-A 10-340536>.

SUMMARY OF THE INVENTION

According to the standards of the DVD-R and DVD-RW, the land pre pit signal has a rule of appearing for every eight (8) wobble cycles, as was mentioned in the above, however in more detail, the land pre pit signal appears in the front-side three (3) cycles of a first half of eight (8) wobble cycles, or the front-side three (3) cycles of a second half of eight (8) wobble cycles, among the continuous 16 wobble cycles. Herein, the front-side 3 cycles of the first 8 cycles are called by "even", while the front-side 3 cycles of the second 8 cycles are called by "odd". Also, 16×13 wobble cycles are called by a "sector", and a land pre pit information of a sector synchronization signal appears in either the even or the odd side of the top 16 wobble cycles of the sector.

Figure 7:
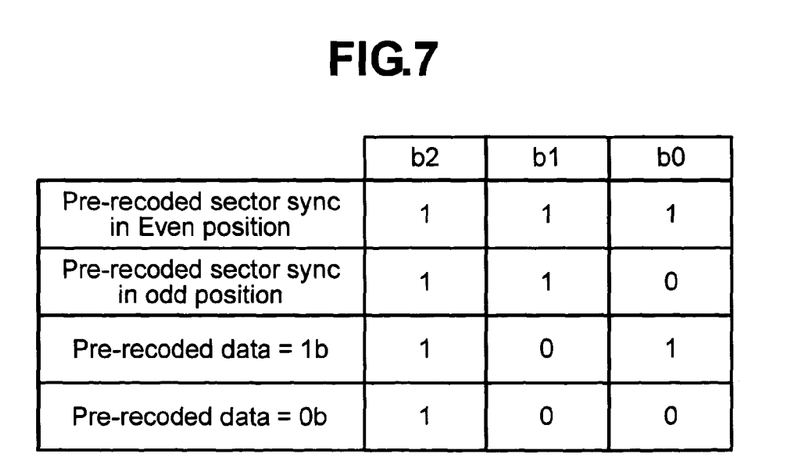
FIG. 7 also shows a data format of the land pre pit signal upon basis of the DVD-R standard.

FIG. 7 shows a chart for showing the meanings of pre pit patterns of the front-side 3 cycles and the respective pre pit patterns thereof, among the wobbles of 8 cycles. Thus, "111" means an even sync pattern recorded at the "even" position, "110" an odd sync pattern recorded at the "odd" position, "101" data of a binary code "1", and "100" data of a binary code "0", respectively. As is shown herein, the land pre pit information is "111", when it has the sync signal in the even side, while it is "110" when it has the sync signal in the "odd" side. Here, for the purpose of detecting the land pre pit information, correctly, from the signals having noises thereon, it is common to conduct the processing thereon, such as, the filtering, the slicing, etc., when a disk recording apparatus reads those signals. However, disappearing of pulses may occur during the steps of conducting such the processing thereon.

Namely, it may sometimes come to be "110" when the pulse falls down at the third cycle of the sync signal "111" in the even side, due to the factors, such as, the noises, etc., for example, and then it is the same to the sync signal in the odd side. Accordingly, the recording apparatus erroneously recognizes to be "odd" in the position thereof, in spite of the "even" position on the disk. An object according to the present invention, therefore, is to protect the recording apparatus from such the shifting in the position for starting the recording.

The object mentioned above, according to the present invention, can be accomplished by provision of a detection cycle counter for counting 16×13 wobble cycles, wherein the detection cycle counter is synchronized when a sync signal of land pre pit information is detected, and at the same time a sync lock flag is set. When detecting the sync pattern indicative of an even, for example, a sync lock flag keeps the condition of being set if the sync pattern indicative of the even is detected after 16×13n (n: a natural number) wobble cycles, or if the sync pattern indicative of the odd is detected after 16×13n+1 wobble cycles, next, and also in a case where the sync pattern of the even or odd is detected at a timing different from the mentioned above, synchronizing is made on the detection cycle counter, as well as, resetting the sync lock flag at the same time. Also, in a case where it cannot be detected for a time period being equal or longer than 16×13m+1 (m: a natural number) wobble cycles, the sync lock flag is reset. And, when the sync lock flag continues the condition of being set for a predetermined time period, a recording timing producing cycle counter, which is provided separately, is synchronized by means of the detection cycle counter.

In more details thereof, according to the present invention, for accomplishing the object mentioned above, there is provided an optical disk recording apparatus, for recording a digital signal on a recordable optical disk, wherein a first sync pattern recorded in a phase 1 and a second sync pattern recorded in a phase 2 are recorded at positions, having a predetermined relationship in the phases the thereof, on a track wobbled at a constant cycle, comprising: a detection window producing means for said phase 1; a detection window producing means for said phase 2; a sync lock flag producing means for producing a sync lock flag indicative of a condition that synchronization is locked; and a recording timing producing means for producing a recording timing onto said optical disc, wherein said sync lock flag producing means produces the sync lock flag indicative of the condition that the synchronization is locked, when the first sync pattern is detected in the phase 1 or when the second sync pattern is detected in the phase 2, while producing a sync lock flag indicative of a condition that the synchronization is unlocked when the first sync pattern is detected in the phase 2, and said recording timing producing means conducts the synchronization on said sync pattern when the sync lock flags are detected, continuously, for a predetermined time period, indicating the condition that the synchronization is locked.

DETAILED DESCRIPTION OF THE PREFERRED EMBODIMENT

Figure 1:
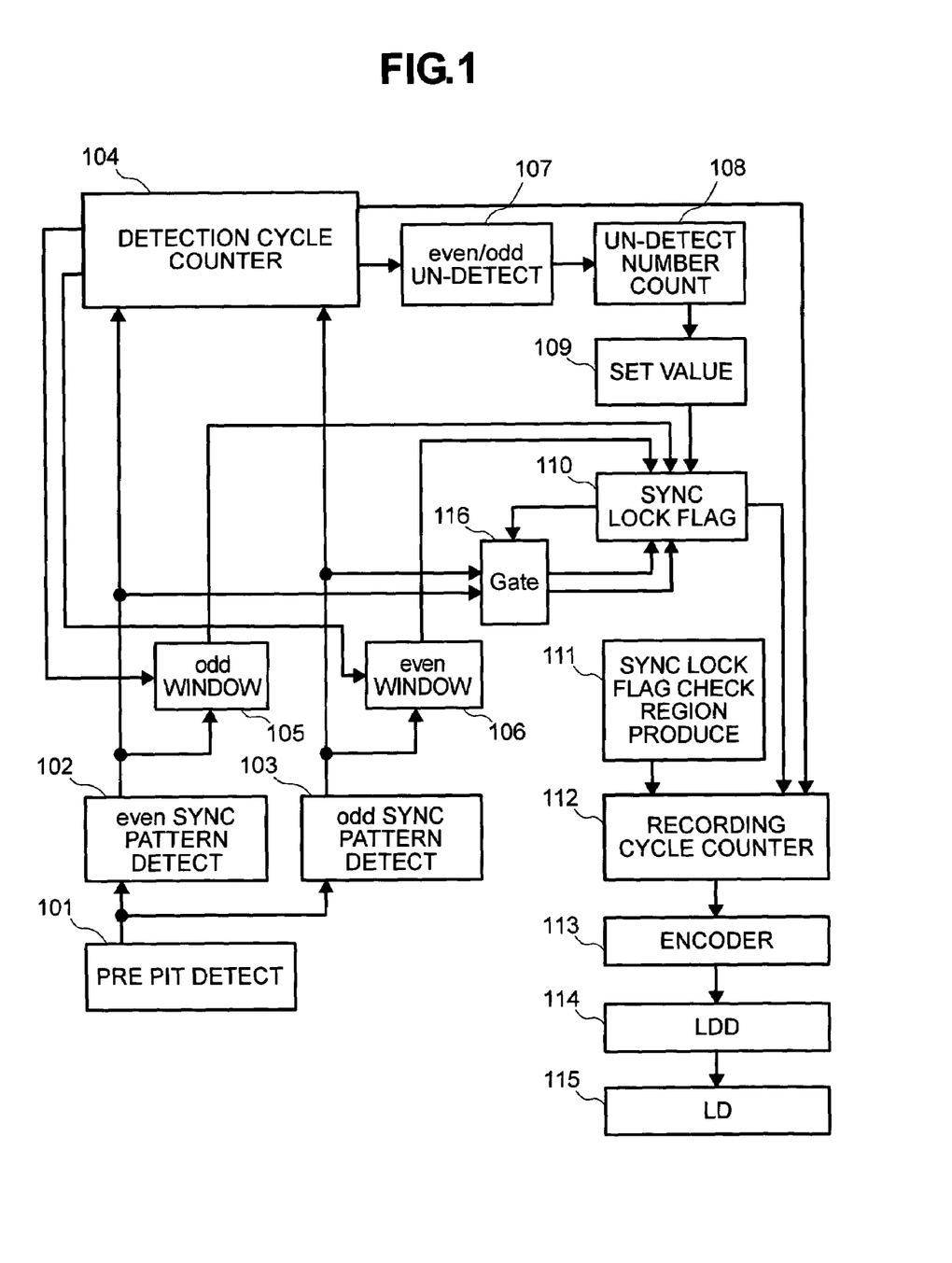
FIG. 1 shows an optical disk recording apparatus, according to one embodiment of the present invention.

Hereinafter, embodiments according to the present invention will be fully explained by referring to the attached drawings. Herein, FIG. 1 is a block diagram of a disk recording apparatus according to the present invention. In this FIG. 1, a reference numeral 101 is a means for detecting a pre pit formed on a land track of a disk, 102 a means for detecting an even sync pattern from the pre pit detected, and 103 a means for detecting an odd sync pattern from the pre pit detected.

The even sync pattern detection means 102 detects the pattern "111", and the odd sync pattern detection means 103 detects the pattern "110", respectively. A reference numeral 104 depicts an detection cycle counter, turning one (1) round by 16×13 wobbles, and it is synchronized with a timing, at which the respective patterns should be generated, when the sync signals are detected by the even sync pattern detection means 102 and the odd sync pattern detection means 103, respectively.

A reference numeral 105 depicts a detection window, which is produced by the detection cycle counter 104 and is opened at a position where the odd sync pattern should be generated. A reference numeral 106 depicts another detection window, which is produced by the detection cycle counter 104 and is opened at a position where the even sync pattern should be generated. A reference numeral 107 depicts an even/odd un-detect signal generation means, and it generates an even/odd un-detect signal when the detection cycle counter 104 counts up for a predetermined period, but not being synchronized with upon detection of the even/odd sync pattern. A un-detect number counter 108 counts the number of times when the even/odd un-detect signals are generated, continuously, but without detecting the even/odd sync pattern.

A reference numeral 109 is a sync un-detect number count setting value, and it produces a sync lock flag reset signal when the even/odd sync pattern un-detect continues and reaches to the number of times, which is set in advance. A sync lock flag 110 is reset by any one of the sync lock flag reset signal from 109, the even sync pattern detection signal from 105, which is gated through the odd window, and the odd sync pattern detection signal from 106, which is gated through the even window.

A gate circuit 116 is opened in a case where the sync lock flag 110 is reset into the unlock condition. When the gate circuit 116 is opened, the sync lock flag 110 is set into the lock condition, by either one of the even sync pattern detection signal, which is detected by the even sync pattern detection means, or the odd sync pattern detection signal, which is detected by the odd sync pattern detection means.

In this manner, the sync lock flag 110 turns into the unlock condition, in any cases where the sync pattern cannot be detected, continuously, for a predetermined time period, when the odd sync pattern is detected at the position where the even sync pattern should be generated, and when the even sync pattern is detected at the position where the odd sync pattern should be generated, and also it turns into the lock condition when the sync pattern is detected under the unlock condition.

If the sync lock flag continues to be under the lock condition for a time period determined by a sync lock flag check region production means 111, a recording cycle counter 112 for producing a recording timing is synchronized with the detection cycle counter. An encoder 113 conducts the encode processing in accordance with the DVD format, at the timing produced by the recording cycle counter. After being waveform shaped in a laser diode driver 114, the encoded signal drives a laser diode 115.

As was mentioned in the above, according to the present embodiment, even if the last digit is lost from the even sync pattern, i.e., "111", then it comes to be the odd sync pattern, i.e., "110", since it is protected by means of the sync flag; therefore the synchronization can be carried out on the recording timing, with stability.

Next, explanation will be made on examples of the land pre pit signals, to be used in the present invention, by referring to FIGS. 2, 3, 4 and 5. All of those FIGS. 2, 3, 4 and 5 are in accordance with the standard of the land pre pit of the DVD-R/RW shown in FIGS. 6 and 7.

Figure 2:
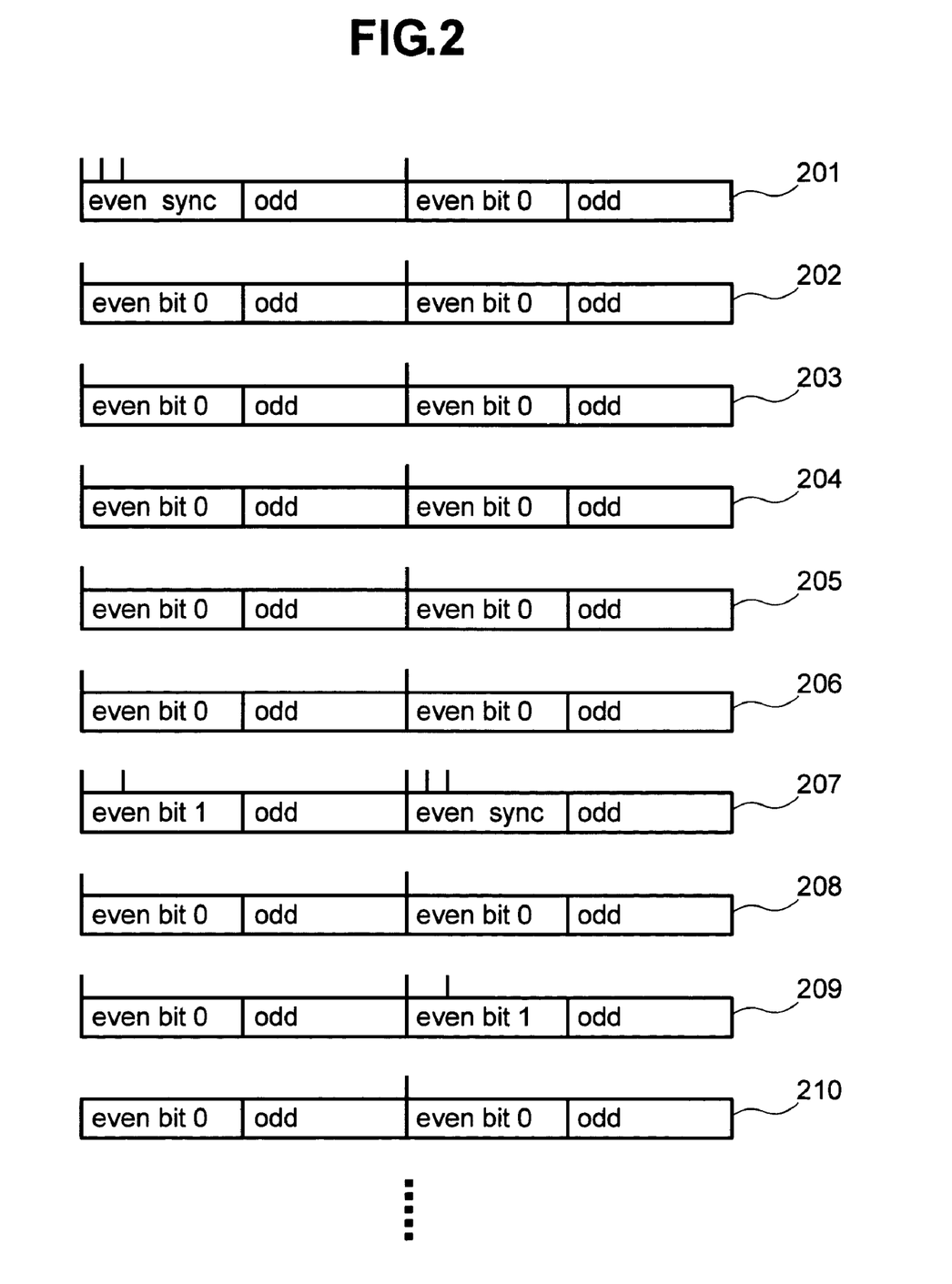
FIG. 2 shows a time chart for an example of land pre pit signals, which will be treated within the present invention.

In FIG. 2, the "even sync pattern" lies at the position of "even", i.e., at the head of 201, and at the position of "even" following thereto lies "0 (binary)" data. On 202-206, the data "0000000000 (binary)" lies at the position of "even". On 207, "1 (binary)" lies at the first "even" position, and at the "even" position following thereto lies "even sync pattern". In the similar manner, on 208-210, "000100 (binary)" lies at the "even" position.

Figure 6:
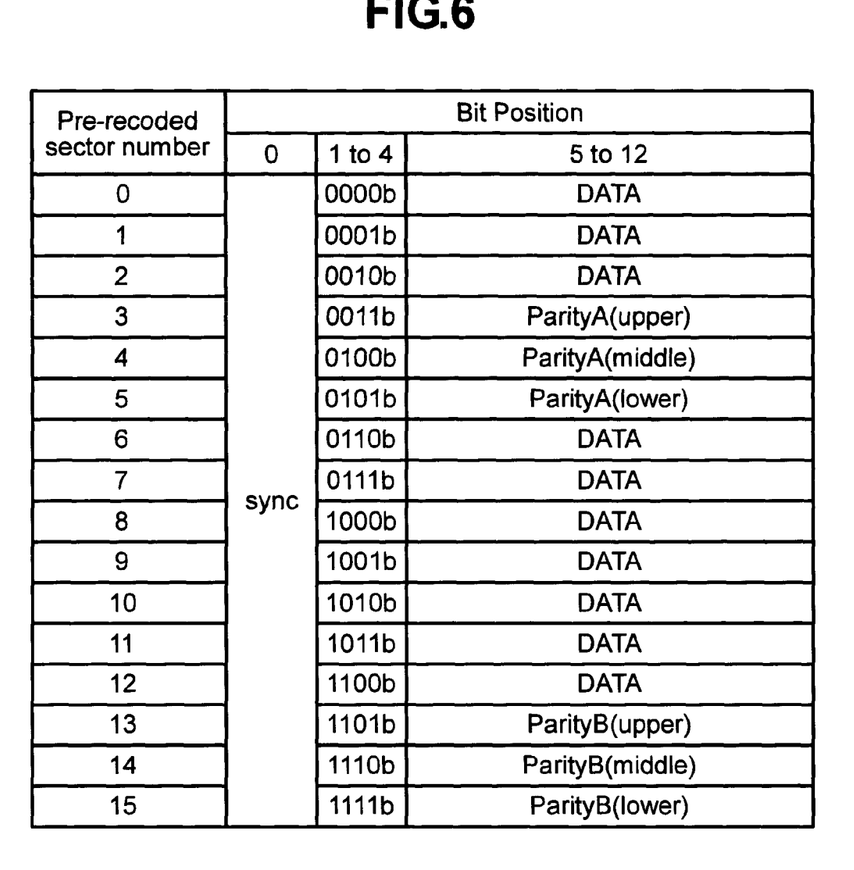
FIG. 6 shows a data format of the land pre pit signal upon basis of the DVD-R standard.

Comparing this to FIG. 6, it can be seen that a relative address "0000" lies after the "sync pattern" of 201, and that a relative address "0001" after the sync pattern of 207.

Figure 3:
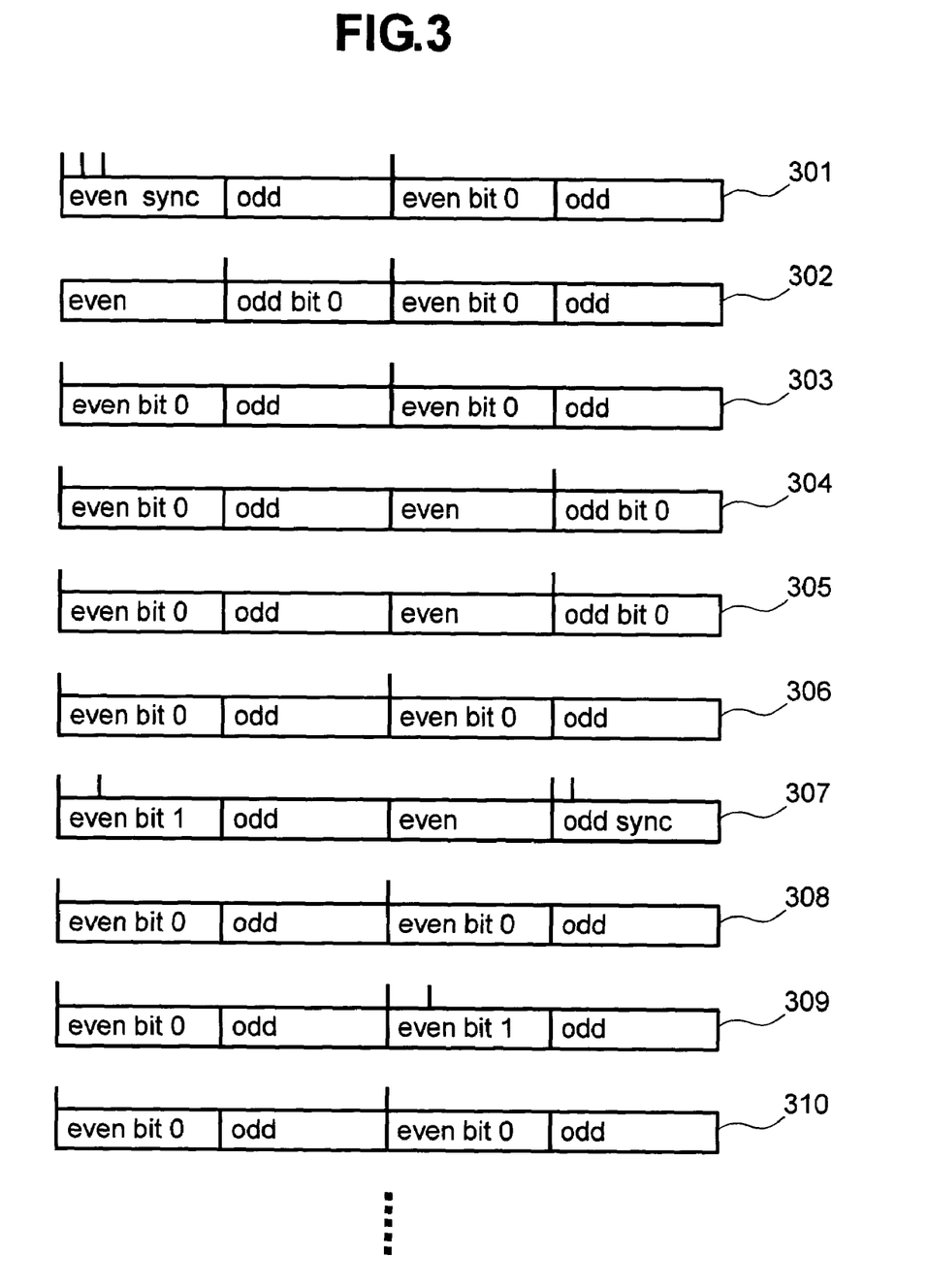
FIG. 3 also shows a time chart for an example of the land pre pit signals, which will be treated within the present invention.

In FIG. 2 is shown a case where all the land pre pits lie at the positions of "even", however according to the DVD standard, it is determined to use the "odd" position, so that the land pre pits are not adjacent to each other on the neighboring tracks. An example, where data is also recorded at the "odd" position, is shown in FIG. 3. Comparing this to FIGS. 6 and 7, it can be seen that the relative address "0000"

and the data "00000001" lie after the "sync pattern" of 301, and the relative address "0001" lies after the "sync pattern" of 307. In the example shown in FIG. 3, although the "odd" sync pattern is used on 307, the data at the "odd" position on 302, 304 and 305 are same to the data shown in FIG. 2.

Figure 4:
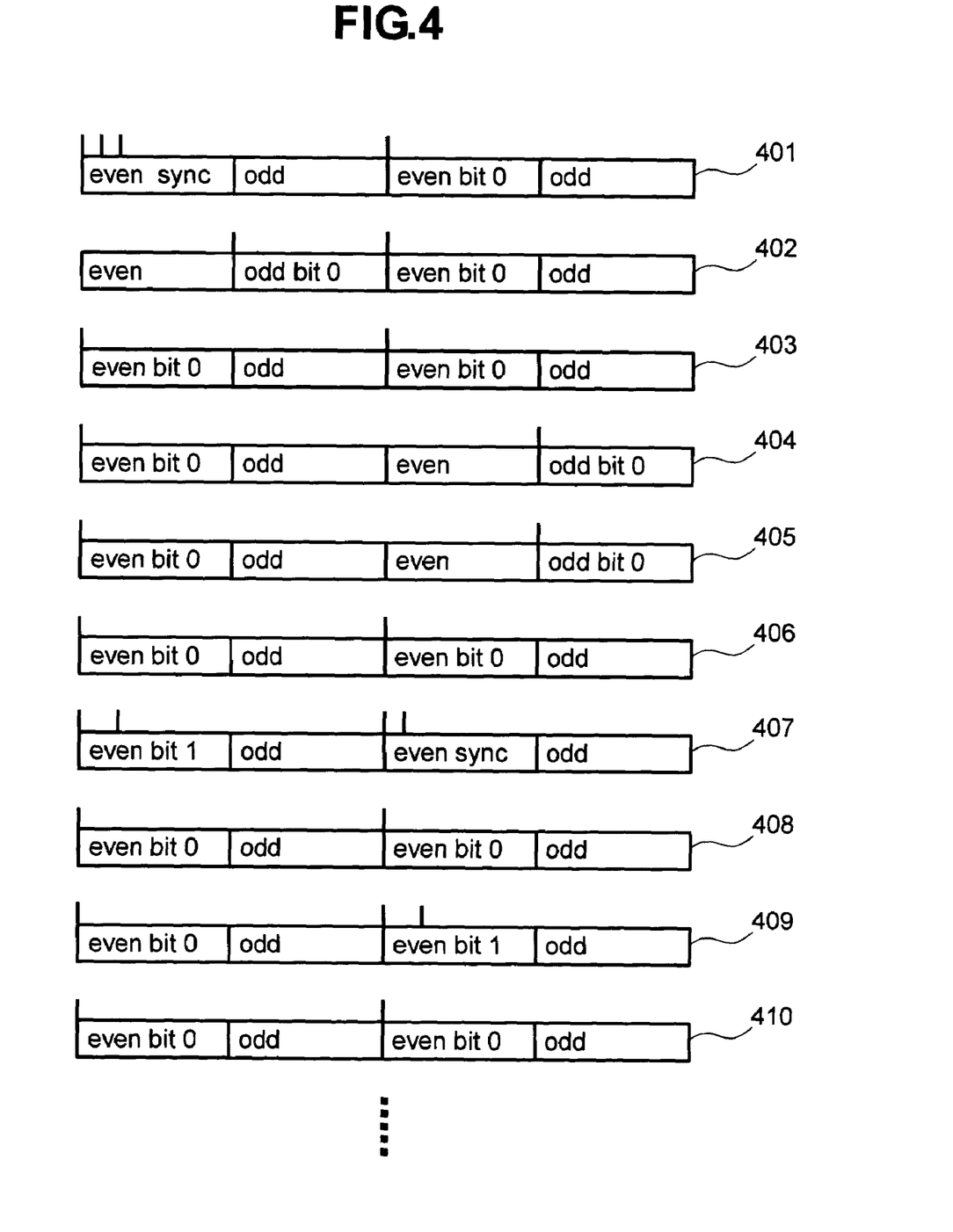
FIG. 4 shows a time chart for an example of the land pre pit signals, which will be treated within the present invention.

Next, an example is shown in FIG. 4, where the sync pattern is erroneously recognized, due to such as a result of filtering process, etc. In the example shown in FIG. 4, the last pulse is lost on the even sync pattern "111" at the position 407 where the even sync patter is recorded, thereby changing into the odd sync pattern, i.e., "110". Accordingly, if recognizing the position where the odd sync pattern is detected to be the position of the "odd", there occurs shifting in the position recognition.

In the embodiment shown in FIG. 1, the detection cycle counter is synchronized with the even sync pattern of 401, and then the windows are produced at the position where the even sync patter should be generated and the position where the odd sync pattern should be generated. In FIG. 4, since the odd sync pattern is detected within the window at the position where the even sync patter should be generated, then the even sync pattern is in the unlock condition. For this reason, the recording cycle counter is inhibited from being synchronized with the detection cycle counter, and therefore the recording is protected from causing the position shifting therein.

Figure 5:
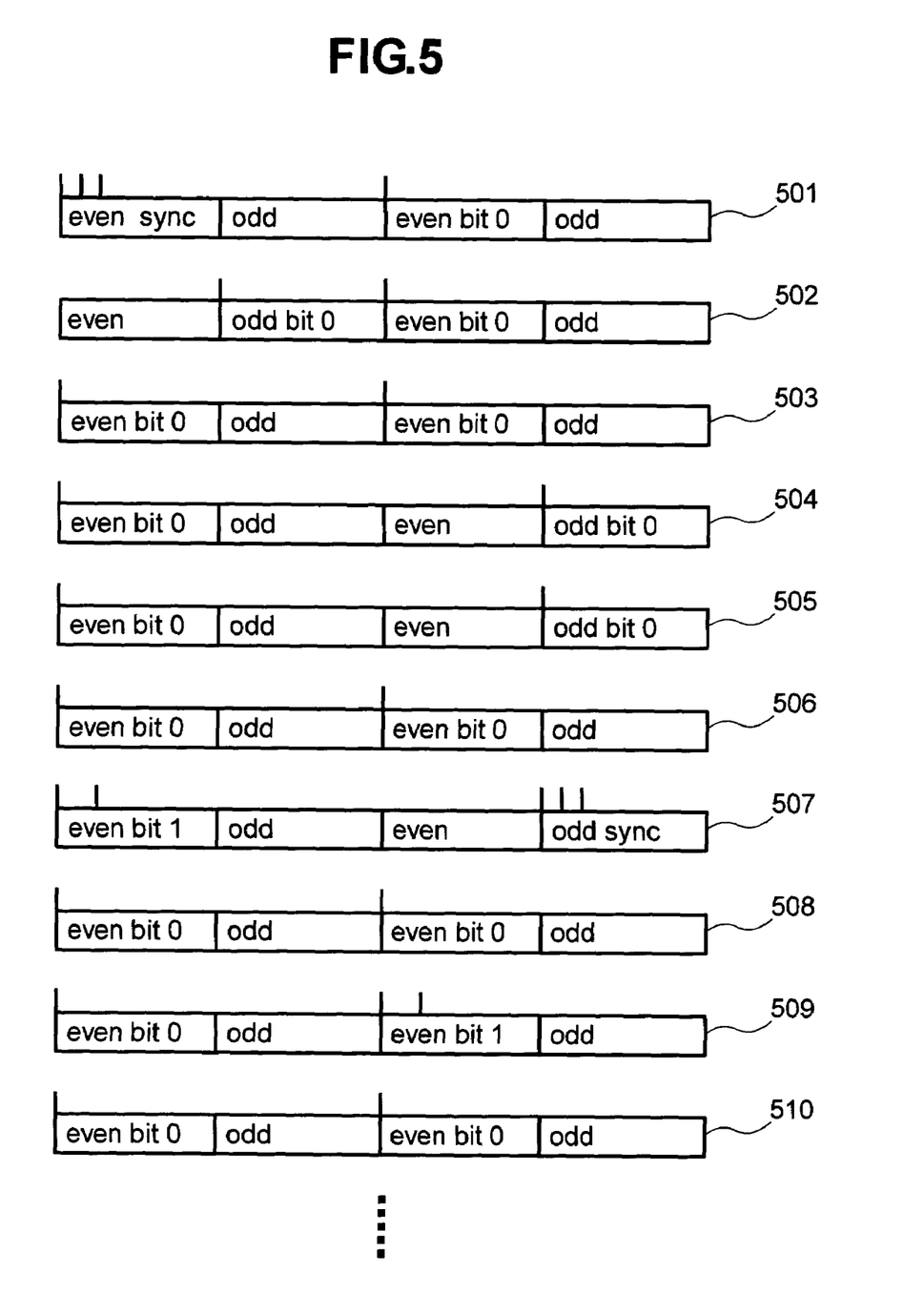
FIG. 5 shows a time chart for an example of the land pre pit signals, which will be treated within the present invention.

Next, an example is shown in FIG. 5, where a pseudo sync pattern is produced, due to mixture of noises, etc. In the example shown in FIG. 5, "1" rises up at the last bit of the odd sync pattern "110", i.e., at the position 507 where the odd sync patter is recorded, due to noises, then it is erroneously recognized to be the even sync pattern "111". Accordingly, if recognizing the position where the even sync pattern is detected to be the position of the "even", there occurs shifting in the position recognition. In the embodiment shown in FIG. 1, since the even sync pattern is detected within the window at the position where the odd sync pattern should be generated, the sync lock flag is in the unlock condition. For this reason, the recording cycle counter is inhibited from being synchronized with the detection cycle counter, and therefore the recording can be protected from being shifted in the position thereof.

Figure 8:
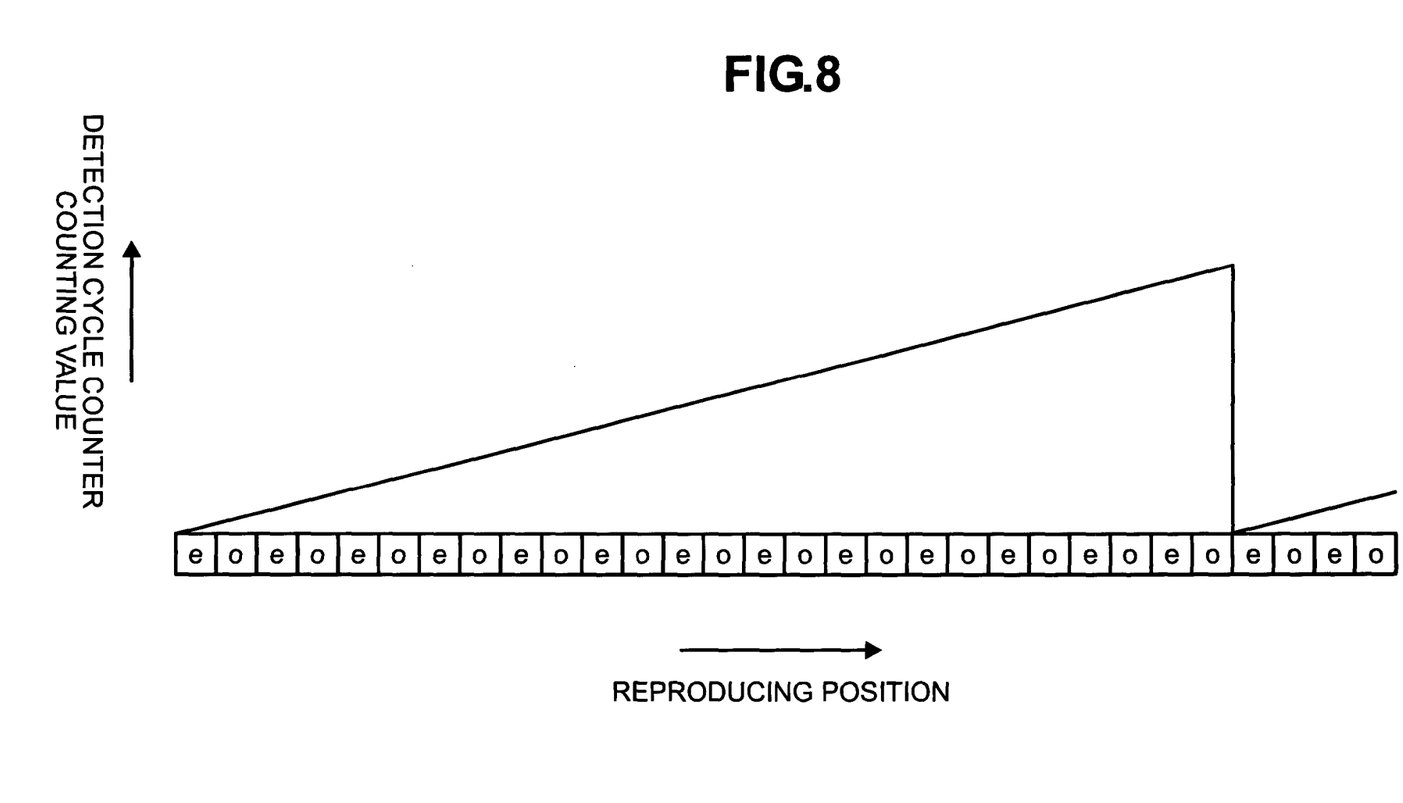
FIG. 8 shows a time chart of a sync detection cycle counter, according to the embodiment.

Next, operation of the detection sync counter will be explained by referring to FIG. 8. The horizontal axis in FIG. 8 indicates a reproduction position while the vertical axis a value of the counter. Being synchronized upon the even sync pattern detection at the left-hand side end in the same figure, the counter value is comes down to zero (0). Then, it counts up the count value by every wobble. After one (1) sector, i.e., at $208^{th}$ wobble (=8 wobbles×2×13), it is the position where the next even sync pattern should be generated. Accordingly, the counter counts up to 207, and it detects the even sync pattern at the position of $208^{th}$ wobble, thereby turning back to zero (0), thereafter conducting the count up, again. Further, the similar processing is carried out when detecting the next odd sync pattern upon the basis of the odd sync pattern detection.

Figure 9:
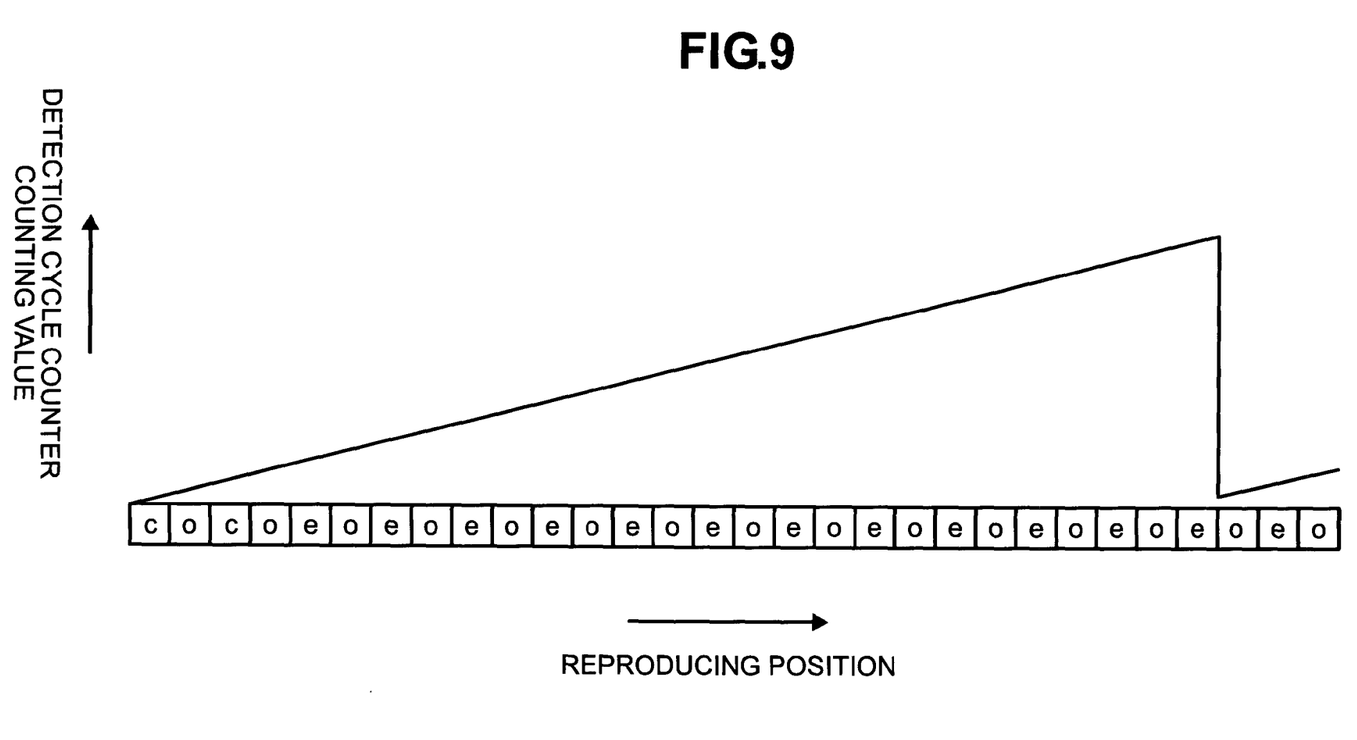
FIG. 9 also shows a time chart of a sync detection cycle counter, according to the embodiment.

FIG. 9 also shows the operation of the detection counter, in a similar manner. The count value comes down to zero (0) at the left-hand side end when detecting the even sync pattern, and thereafter it counts up the count value for every wobble. Since the next sync pattern lies at the "odd" position in FIG. 9, $216^{th}$ wobble (=1 sector+8 wobbles) is the position where the next odd sync pattern should be generated. Accordingly, after counting the count value up to 215, it is preset to eight (8). However, when detecting the next even sync pattern upon the basis of the odd sync pattern detection, since $200^{th}$ wobble (=1 sector−8 wobbles) from the odd sync pattern is the position where the next even sync pattern should be generated, therefore the count value is preset to 0 after counting up to 199.

Next, explanation will be given on synchronization in the recording cycle counter, by referring to FIG. 10. This FIG. 10 shows the detection condition for each of the sync signal of "even" or "odd" at a unit of sector, and behavior of the sync lock flag for it, as well as, the synchronization operation of the recording cycle counter.

Figure 10:
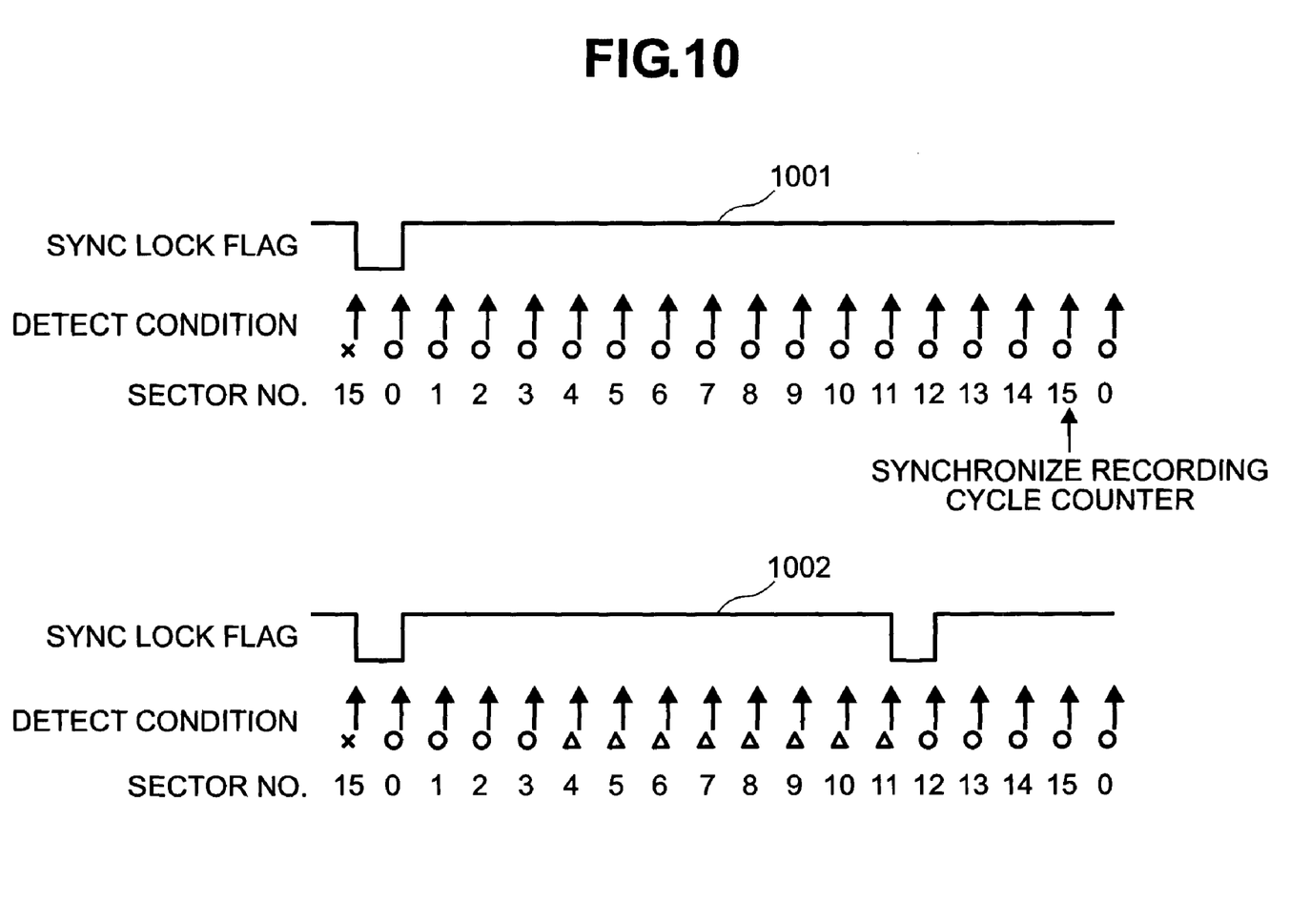
FIG. 10 shows a time chart of a recording cycle counter, according to the embodiment.

In FIG. 10, "x" indicates the condition where the odd sync pattern is detected within the even sync pattern detection window, or the condition where the even sync pattern is detected within the odd sync pattern detection window. A mark "Δ" indicates a case where no new sync pattern cannot be detected after passing 208 or 215 wobble cycles. A mark "O" indicates the condition where the even sync pattern is detected within the even sync pattern detection window, or the condition where the odd sync pattern is detected within the odd sync pattern detection window. The "sector No." indicates the relative address, which was shown in FIG. 6, from bit1 to bit4.

In 1001, the sector 15 at the end of the left-hand side is in the "x" condition, and the sync lock flag is in the unlock condition. It comes into the "O" condition at the sector 1, and then the sync lock flag turns back into the lock condition. Hereinafter, the detection condition continues to be "O" from the sector 0 to the sector 15, and the sync lock flag continues to be the lock condition. When continuing the lock condition during this time period, the synchronization is carried out on the recording cycle counter.

Next, an example of the time period is shown, which is determined by the sync lock flag check region producing means 111 shown in FIG. 1. In 1002, it is in the "x" condition at the sector of the left-hand side end, and then the sync lock flag is in the unlock condition. Also, it is in the "O" condition at the sector 1, and then the sync lock flag turns back to the lock condition. The "Δ" condition continues eight (8) times from the sector 4, and at the sector 11, the sync lock flag turns into the unlock condition.

Herein is shown a case where the setting number of times is eight (8), in the operation of producing the sync lock flag reset signal when the even/odd sync pattern un-detect shown in FIG. 1 reaches to a number of times that is set in advance. In this case, since the lock condition does not continue for the time period from the sector 0 to the sector 15, therefore no synchronization is carried out on the recording cycle counter. In the above, the detailed operation was explained on the recording cycle counter.

However, although it is indicated that the synchronization may be conducted by any number of times, if the lock condition continues for the time period between the sector 0 to the sector 15, in the present example, but it is also possible that the synchronization is conducted only one (1) time, i.e., at the first time among those when the conditions are satisfied, during the time period, starting from beginning read-out of the land pre pits after moving a pick until the recording. Limiting the number of times of synchronization to only one (1) time enables to reduce the possibility of shifting due to the erroneous sync patter, much more.

Figure 11:
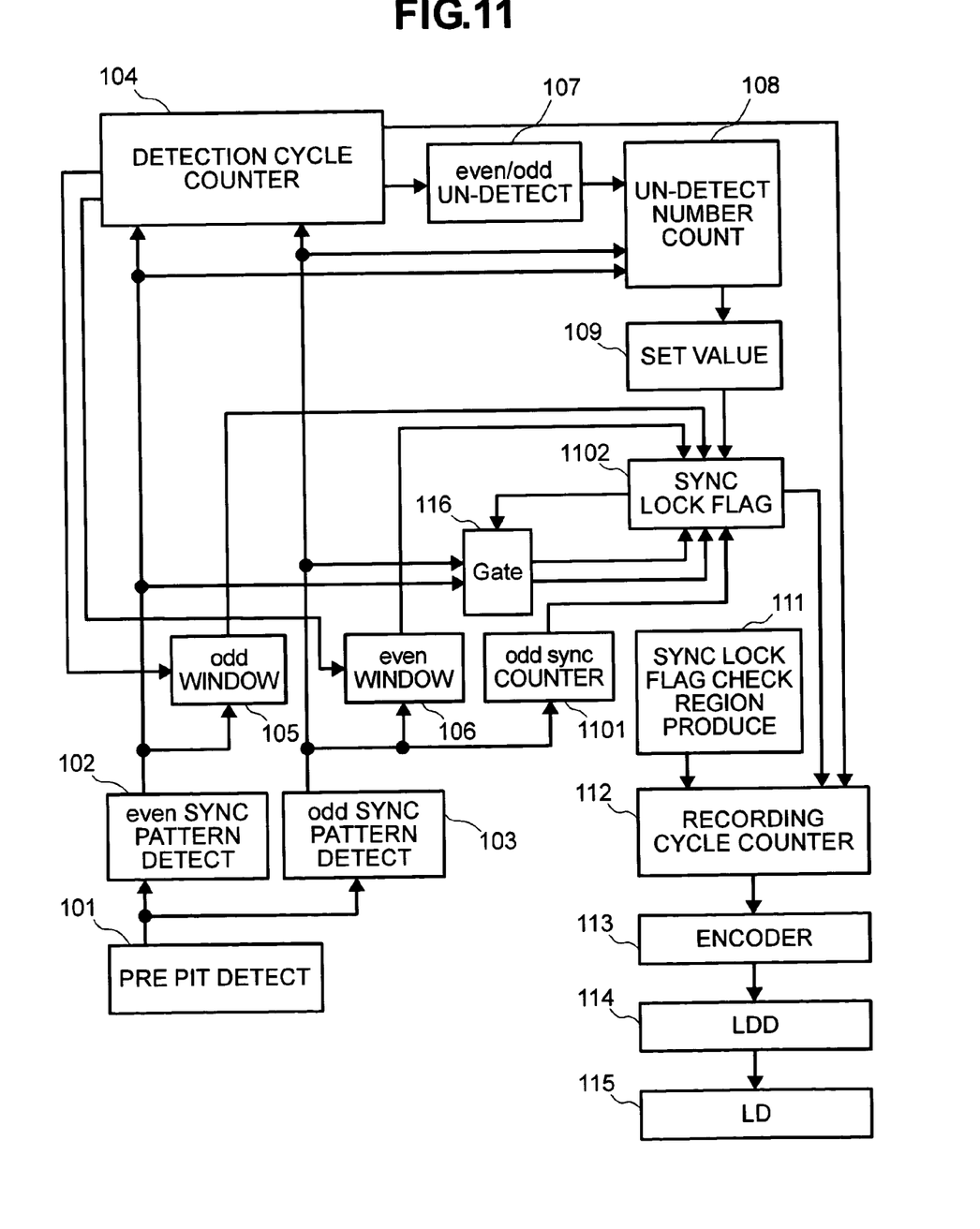
FIG. 11 shows an optical disk recording apparatus, according to other embodiment of the present invention.

Next, explanation will be given on other embodiment according to the present invention. FIG. 11 is a block diagram of the disc recording apparatus according to the present invention. In FIG. 11, the structures are same to those shown in FIG. 1, but except for 1101 and 1102. The reference numeral 1101 indicates an odd sync pattern counter, and it counts up the number of the odd sync patterns within the region, which is determined by the sync lock flag check region production means 111, so as to resets the sync lock flag 1102 when it exceeds a predetermined number, thereby bringing it into the unlock condition. Other operations thereof are same to those of the disc recording apparatus shown in FIG. 1. The present embodiment utilizes the fact that, inherently, the odd sync pattern is used for the purpose of shifting the position thereof if the even sync patterns are adjacent with each other on the neighboring tracks, and therefore it will never exceeds a certain ratio. According to the present embodiment, it is possible to enhance the protection from generating the position shifting when recording.

Figure 12:
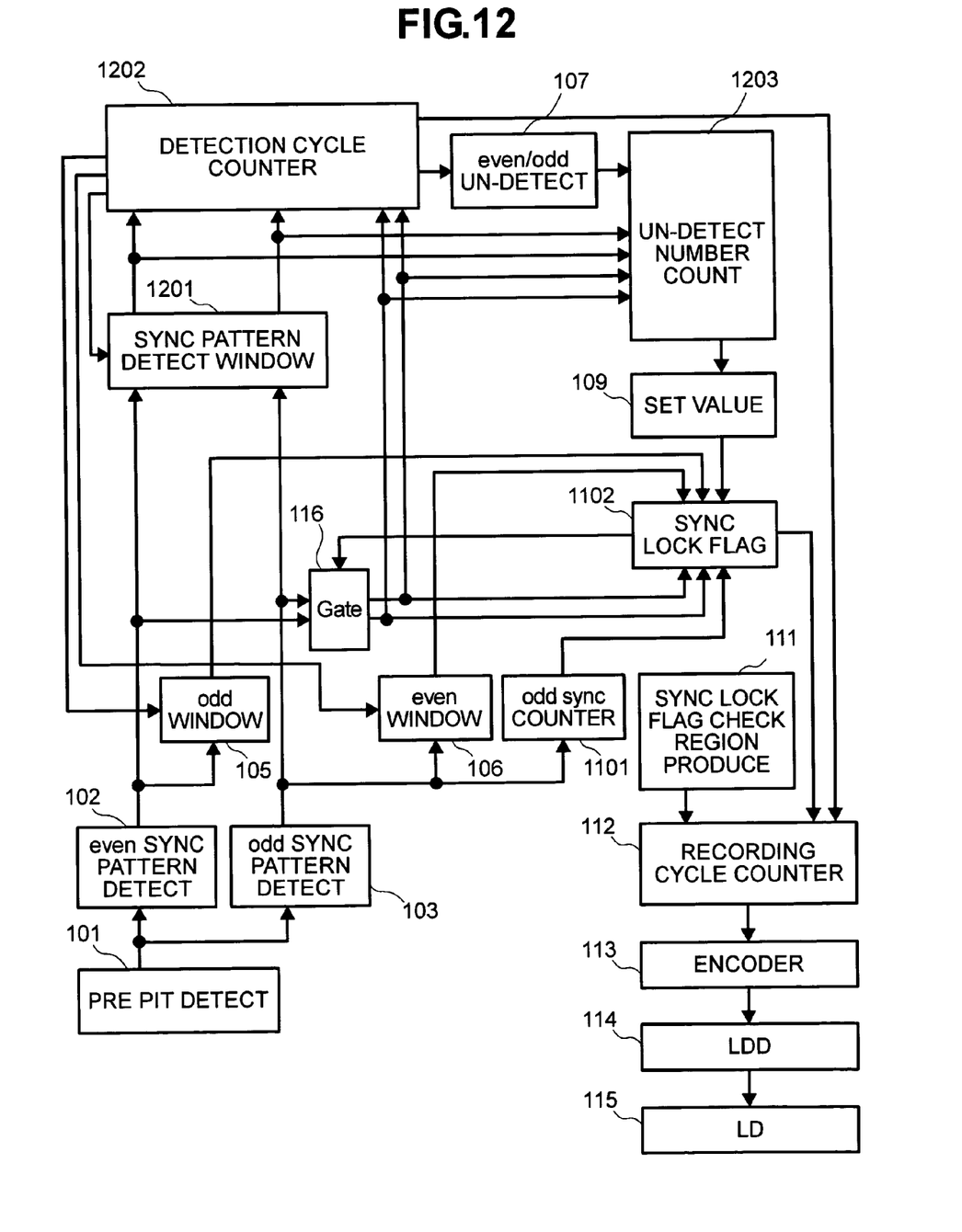
FIG. 12 shows an optical disk recording apparatus, according to further other embodiment of the present invention.

Next, explanation will be given on further other embodiment according to the present invention. FIG. 12 is a block diagram of the disc recording apparatus according to the present invention. In FIG. 12, the structures are same to those shown in FIG. 11, but except for 1201, 1202 and 1203. The reference numeral 1201 indicates a sync detection window; thus, a window to be opened at the position where the even sync pattern or the odd sync pattern should be generated. The detection cycle counter 1202 may be synchronized with, also via the sync pattern not passing through the sync detection window 1201, in the case where the sync lock flag 1102 is in the unlock condition, however in the case where the sync lock flag is in the lock condition, the synchronization is carried out on the detection cycle counter 1202 only when the sync pattern detection is conducted within the sync detection window 1201. However, this sync detection window 1201 is produced by means of detection cycle counter 1202. Also, an un-detect number counter 1203 may be reset by the sync pattern that does not passing through the sync detection window 1201, in the case where the sync lock flag 1102 is in the unlock condition, however in the case where the sync lock flag is in the lock condition, it is reset only in the case where the sync pattern detection is conducted within the sync detection window 1201. Other operations are similar to those of the disc recording apparatus shown in FIG. 11. According to the present embodiment, since the detection cycle counter 1202 does not conduct the synchronization on the pseudo sync pattern during when conducting the sync lock, even in the case where the pseudo sync patterns are generated due to noises at the land pre pits indicating the data bits, therefore no such the position shift occurs in the recording cycle counter, thereby achieving the recording at the correct position.

Figure 13:
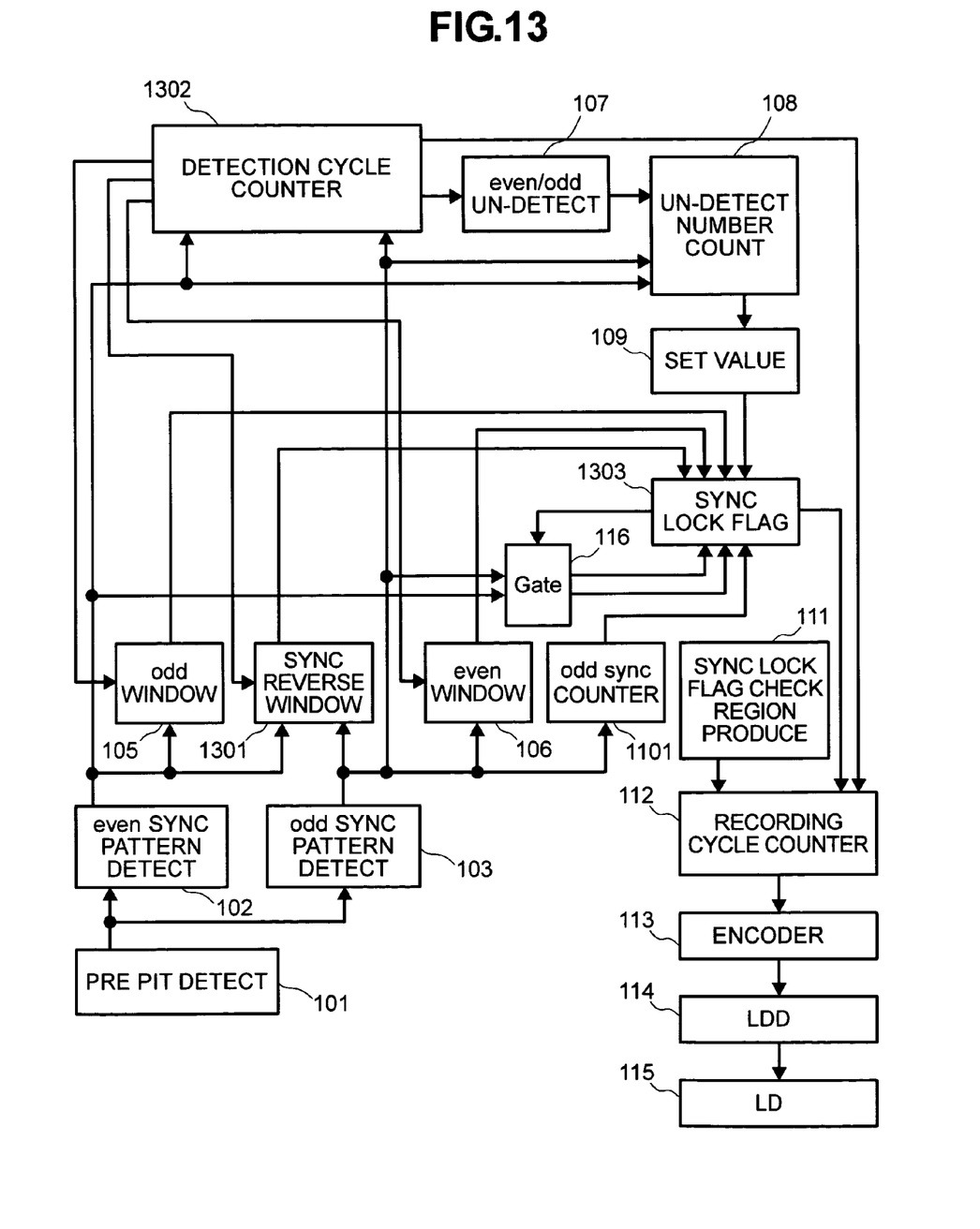
FIG. 13 also shows an optical disk recording apparatus, according to further other embodiment of the present invention.

Next, explanation will be given on further other embodiment according to the present invention. FIG. 13 is a block diagram of the disc recording apparatus according to the present invention. In FIG. 13, the structures are same to those shown in FIG. 11, but except for 1301, 1302 and 1303. The reference numeral 1301 indicates a reverse signal of the sync detection window 1201, and it opens the window at the position where, inherently, the sync signal should be detected. The reverse window 1301 is produced by means of a detection cycle counter 1302. With the sync pattern, passing through the reverse window 1301 to be detected, a sync lock flag 1303 is reset, and it is in the unlock condition. Accordingly, the recording cycle counter is not synchronized with, even if detecting the sync pattern passing through the reverse window, therefore the synchronization will not occur, erroneously.

As was fully explained in the above, according to the present invention, it is possible to protect the recording position from being shifted in the position thereof, if the even sync pattern is erroneously detected to be the odd sync pattern, or if the odd sync pattern is erroneously detected to be the even sync pattern.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical disk recording apparatus, for recording a digital signal on a recordable optical disc, wherein either a first sync pattern recorded in a phase 1 or a second sync pattern recorded in a phase 2 is recorded at a position having a predetermined relationship in the phases thereof on a track wobbled at a constant cycle, comprising:

a detection window producing means for said phase 1;

a detection window producing means for said phase 2;

a sync lock flag producing means for producing a sync lock flag indicative of a condition that synchronization is locked; and a recording timing producing means for producing a recording timing for recording the digital signal onto said optical disc, wherein said sync lock flag producing means produces the sync lock flag indicative of the condition that the synchronization is locked, when the first sync pattern is detected in the phase 1 or when the second sync pattern is detected in the phase 2, while producing a sync lock flag indicative of a condition that the synchronization is unlocked, when the first sync pattern is detected in the phase 2 or when said second synch pattern is detected in said phase 1, and said recording timing producing means conducts the synchronization on said sync pattern when the sync lock flags are detected, continuously, for a predetermined time period, indicating the condition that the synchronization is locked.

2. An optical disk recording apparatus, for recording a digital signal on a recordable optical disc, wherein either a first sync pattern recorded in a phase 1 or a second sync pattern recorded in a phase 2 is recorded at a position having a predetermined relationship in the phases thereof on a track wobbled at a constant cycle, comprising:

a detection window producing means for said phase 1;

a detection window producing means for said phase 2;

a sync lock flag producing means for producing a sync lock flag indicative of a condition that synchronization is locked; and a recording timing producing means for producing a recording timing for recording the digital signal onto said optical disc, wherein said sync lock flag producing means produces the sync lock flag indicative of the condition that the synchronization is locked, when the first sync pattern is detected in the phase 1 or when the second sync pattern is detected in the phase 2, while producing a sync lock flag indicative of a condition that the synchronization is unlocked, when the sync pattern is not detected within a predetermined time period, in both phases of the phase 1 and the phase 2, and said recording timing producing means conducts the synchronization on said sync pattern when the sync lock flags are detected, continuously, for a predetermined time period, indicating the condition that the synchronization is locked.

3. An optical disk recording apparatus, for recording a digital signal on a recordable optical disc, wherein either a first sync pattern recorded in a phase 1 or a second sync pattern recorded in a phase 2 is recorded at a position having a predetermined relationship in the phases thereof on a track wobbled at a constant cycle, comprising:

a detection window producing means for said phase 1;
a detection window producing means for said phase 2;
a sync lock flag producing means for producing a sync lock flag indicative of a condition that synchronization is locked; and
a recording timing producing means for producing a recording timing for recording the digital signal onto said optical disc,
wherein said sync lock flag producing means produces the sync lock flag indicative of the condition that the synchronization is locked, when the first sync pattern is detected in the phase 1 or when the second sync pattern is detected in the phase 2, while producing a sync lock flag indicative of a condition that the synchronization is unlocked, when the sync pattern is detected in a phase, which is not any one of the phase 1 and the phase 2, and
said recording timing producing means conducts the synchronization on said sync pattern when the sync lock flags are detected, continuously, for a predetermined time period, indicating the condition that the synchronization is locked.

4. An optical disk recording apparatus, for recording a digital signal on a recordable optical disc, wherein either a first sync pattern recorded in a phase 1 or a second sync pattern recorded in a phase 2 is recorded at a position having a predetermined relationship in the phases thereof on a track wobbled at a constant cycle, comprising:

a detection window producing means for said phase 1;
a detection window producing means for said phase 2;
a sync lock flag producing means for producing a sync lock flag indicative of a condition that synchronization is locked;
a recording timing producing means for producing a recording timing for recording the digital signal onto said optical disc; and
a counting means for counting a number of detection of the sync pattern for the phase 1 for a predetermined time period,
wherein said sync lock flag producing means produces the sync lock flag indicative of the condition that the synchronization is locked, when the first sync pattern is detected in the phase 1 or when the second sync pattern is detected in the phase 2, while producing a sync lock flag indicative of a condition that the synchronization is unlocked, when said counting means continuously counts a value being equal or greater than a predetermined one, and
said recording timing producing means conducts the synchronization on said sync pattern when the sync lock flags are detected, continuously, for a predetermined time period, indicating the condition that the synchronization is locked.

5. An optical disk recording apparatus, for recording a digital signal on a recordable optical disc, wherein either a first sync pattern recorded in a phase 1 or a second sync pattern recorded in a phase 2 is recorded at a position having a predetermined relationship in the phases thereof on a track wobbled at a constant cycle, comprising:

a detection cycle counter for counting a predetermined time period, and being synchronized by the sync pattern;
a detection window producing means for said phase 1;
a detection window producing means for said phase 2;
a sync lock flag producing means for producing a sync lock flag indicative of a condition that synchronization is locked; and
a recording timing producing means for producing a recording timing for recording the digital signal onto said optical disc,
wherein said sync lock flag producing means produces the sync lock flag indicative of the condition that the synchronization is locked, when the first sync pattern is detected in the phase 1 or when the second sync pattern is detected in the phase 2, while producing a sync lock flag indicative of a condition that the synchronization is unlocked, when the first sync pattern is detected in the phase 2 or when said second sync pattern is detected in said phase 1, and
said detection cycle counter conducts the synchronization on said sync pattern when the sync lock flags are detected, continuously, for a predetermined time period, indicating the condition that the synchronization is locked.

6. An optical disk recording apparatus, for recording a digital signal on a recordable optical disc, wherein either a first sync pattern recorded in a phase 1 or a second sync pattern recorded in a phase 2 is recorded at a position having a predetermined relationship in the phases thereof on a track wobbled at a constant cycle, comprising:

a detection cycle counter for counting a predetermined time period, and being synchronized by the sync pattern;
a first detection window producing means for producing a detection window for the phase 1 upon basis of said detection cycle counter;
a second detection window producing means for producing a detection window for the phase 2 upon basis of said detection cycle counter;
a sync lock flag producing means for producing a sync lock flag indicative of a condition that synchronization is locked; and
a recording timing producing means for producing a recording timing for recording the digital signal onto said optical disc,
wherein said sync lock flag producing means produces a sync lock flag indicative of a condition that the synchronization is unlocked, when a sync pattern that should appear in the phase 1 is detected in the phase 2 or when a sync pattern that should appear in said phase 2 is detected in phase 1, and
the synchronization is conducted on the detection cycle counter and the recording timing producing means, only at a first time during a time period after access until starting of recording, when the sync lock flag does not turns into the unlock condition during a predetermined time period indicated by data of land pre pits.

7. An optical disk recording apparatus, for recording on an optical disc, wherein either a first sync pattern recorded in a phase 1 or a second sync pattern recorded in a phase 2 is recorded at a position having a predetermined relationship in the phases thereof on a track wobbled at a constant cycle, comprising:

a laser for recording information onto said optical disc;
a laser driver means for driving said laser;

a first sync pattern detecting means for detecting said first sync pattern;

a second sync pattern detecting means for detecting said second sync pattern;

a first detection window producing means for producing a first detection window for detecting said first sync pattern;

a second detection window producing means for producing a second detection window for detecting said second sync pattern; and a sync lock flag producing means for producing a sync lock flag indicative of a condition that synchronization is unlocked, when said second sync pattern is detected within said first detection window or when said first sync pattern is detected within said second detection window.

8. The optical disk recording apparatus, as described in the claim 7, wherein said sync lock flag producing means produces the flag indicative of the condition that the synchronization is locked in a case when said first sync pattern is continuously detected a plural number of times within said first detection window, or when said second sync pattern is continuously detected a plural number of times within said second detection window.

9. The optical disk recording apparatus, as described in the claim 7, wherein said optical disc is a DVD-R or a DVD-RW, and said first sync pattern is an odd sync pattern while said second sync pattern an even sync pattern.

10. The optical disk recording apparatus, as described in the claim 8, wherein said optical disc is a DVD-R or a DVD-RW, and said first sync pattern is an odd sync pattern while said second sync pattern an even sync pattern.

11. An optical disk recording apparatus, for recording on an optical disc, wherein either a first sync pattern recorded in a phase 1 or a second sync pattern recorded in a phase 2 is recorded at a position having a predetermined relationship in the phases thereof on a track wobbled at a constant cycle, comprising:

a laser for recording information onto said optical disc;

a laser driver means for driving said laser;

a first sync pattern detecting means for detecting said first sync pattern; and a detection window producing means for producing a detection window for detecting any one of said sync patterns, wherein information is recorded on said optical disc by using said laser after recognizing either that said first sync patterns in the phase 1 or that said second sync pattern is in phase 2, continuously, by a plural number of times thereof, without said first sync pattern occurring in said phase 2 or said second sync pattern occurring in said phase 1 during said plural number of times.

12. An optical disk recording method, for recording a digital signal on a recordable optical disc, wherein either a first sync pattern recorded in a phase 1 or a second sync pattern recorded in a phase 2 is recorded at a position having a predetermined relationship in the phases thereof on a track wobbled at a constant cycle, comprising the following steps of:

producing a sync lock flag indicative of a condition that synchronization is locked, when the first sync pattern is detected in the phase 1 or when the second sync pattern is detected in the phase 2;

producing a sync lock flag indicative of a condition that the synchronization is unlocked, when the first sync pattern is detected in the phase 2 or when the second sync pattern is detected in the phase 1; and recording the digital signal on said optical disc in synchronism with said sync pattern, when the sync lock flag is produced indicative of the condition that the synchronization is locked, continuously, in a plural number of times thereof.

13. An optical disk recording method, for recording a digital signal on a recordable optical disc, wherein either a first sync pattern recorded in a phase 1 or a second sync pattern recorded in a phase 2 is recorded at a position having a predetermined relationship in the phases thereof on a track wobbled at a constant cycle, comprising the following steps of:

producing a sync lock flag indicative of a condition that synchronization is locked, when the first sync pattern is detected in the phase 1 or when the second sync pattern is detected in the phase 2;

producing a sync lock flag indicative of a condition that the synchronization is unlocked, when the sync pattern is not detected within a predetermined time period in both phases, the phase 1 and the phase 2; and recording the digital signal on said optical disc in synchronism with said sync pattern, when the sync lock flag is produced indicative of the condition that the synchronization is locked, continuously, in a plural number of times thereof.

* * * * *